(12) United States Patent
Li et al.

(10) Patent No.: US 11,341,446 B2
(45) Date of Patent: May 24, 2022

(54) PERSONALIZED BEHAVIOR-DRIVEN DYNAMIC RISK MANAGEMENT WITH CONSTRAINED SERVICE CAPACITY

(71) Applicant: INTERNATIONAL BUSINESS MACHINES CORPORATION, Armonk, NY (US)

(72) Inventors: Hongfei Li, Briarcliff Manor, NY (US); Wei Sun, Tarrytown, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 557 days.

(21) Appl. No.: 15/181,919

(22) Filed: Jun. 14, 2016

(65) Prior Publication Data

US 2017/0357922 A1    Dec. 14, 2017

(51) Int. Cl.
   *G06Q 10/06*      (2012.01)
(52) U.S. Cl.
   CPC ................. *G06Q 10/0635* (2013.01)
(58) Field of Classification Search
   None
   See application file for complete search history.

(56) References Cited

U.S. PATENT DOCUMENTS

| | | |
|---|---|---|
| 6,417,650 B1 | 7/2002 | Stefanovic et al. |
| 7,853,520 B2 | 12/2010 | Choudhuri et al. |
| 7,895,323 B2 | 2/2011 | Gupta et al. |

(Continued)

FOREIGN PATENT DOCUMENTS

| | | | | |
|---|---|---|---|---|
| EP | 2498198 A1 | * | 9/2012 | ........... G06F 21/554 |
| WO | 2010006345 | | 1/2010 | |

OTHER PUBLICATIONS

Shaw, William et al. Manage at work: a randomized, controlled trial of a self-management group intervention to overcome workplace challenges associated with chronic physical health conditions. BMC Public Health, 14, 515. Year: 2014. (Year: 2014).*

(Continued)

*Primary Examiner* — Patricia H Munson
*Assistant Examiner* — Nancy N Prasad
(74) *Attorney, Agent, or Firm* — Tutunjian & Bitetto, P.C.; Joseph Petrokaitis

(57) ABSTRACT

A method is provided for personalized behavioral-driven event management. The method includes determining, by a processor, derivative behaviors from user behavioral data for one or more users. The derivative behaviors include intent driven behavioral data and habitual behavioral data. The method further includes deriving, by the processor, one or more behavioral triggers that differentiate the intent driven behavioral data from the habitual behavioral data. The method also includes generating, by the processor, a risk prediction based on a predictive risk assessment model that uses the intent driven behavioral data differentiated from the habitual behavioral data by the one or more behavioral triggers to enhance a predictive power of the user behavioral data. The method additionally includes enabling, by the processor, risk intervention for at least one of the one or more users by directly targeting the behavioral triggers, responsive to the risk prediction.

16 Claims, 7 Drawing Sheets

(56) References Cited

U.S. PATENT DOCUMENTS

| | | |
|---|---|---|
| 8,126,891 B2 | 2/2012 | Laxman et al. |
| 8,285,596 B2 | 10/2012 | Sharma |
| 8,417,650 B2 | 4/2013 | Graepel et al. |
| 8,548,904 B1 | 10/2013 | Bear et al. |
| 8,620,798 B2 | 12/2013 | Faith et al. |
| 8,666,884 B2 | 3/2014 | Curry et al. |
| 8,843,621 B2 | 9/2014 | DeJana et al. |
| 9,165,270 B2 | 10/2015 | Dickinson et al. |
| 2009/0043593 A1 | 2/2009 | Herbrich et al. |
| 2009/0307074 A1* | 12/2009 | Sharma ............ G06Q 30/0224 705/7.34 |
| 2010/0228584 A1* | 9/2010 | Nash .................. G06Q 10/00 705/320 |
| 2014/0067352 A1* | 3/2014 | Ashok .................. E21B 41/00 703/6 |
| 2014/0136397 A1 | 5/2014 | Morgan et al. |
| 2015/0012147 A1* | 1/2015 | Haghighat-Kashani ................ G06Q 50/06 700/291 |
| 2015/0012334 A1 | 1/2015 | Rose et al. |
| 2015/0161623 A1 | 6/2015 | Rahman et al. |
| 2015/0235321 A1 | 8/2015 | Unser et al. |
| 2015/0334129 A1 | 11/2015 | Moyle et al. |

OTHER PUBLICATIONS

Xiaoyuan, L., "Risk Aversion Behaviors of Consumers with Different Impulse Buying Tendency", 2014 Seventh International Symposium on Computational Intelligence and Design, Dec. 2014, pp. 336-339.

Poel, et al., "Customer Attrition Analysis For Financial Services Using Proportional Hazard Models", Universiteit Gent, Jan. 2003, pp. 1-45.

* cited by examiner

PERSONALIZED BEHAVIOR-DRIVEN DYNAMIC RISK MANAGEMENT WITH CONSTRAINED SERVICE CAPACITY

BACKGROUND

Technical Field

The present invention generally relates to risk management, and more particularly to personalized behavior-driven dynamic risk management with constrained service capacity.

Description of the Related Art

As individual behavior evolves with time, an essential part of effective risk management is to detect triggers based on user behavior and intervene appropriately to mitigate risk. Thus, there is a need for personalized behavior-driven dynamic risk management.

SUMMARY

According to an aspect of the present principles, a method is provided for personalized behavioral-driven event management. The method includes determining, by a processor, derivative behaviors from user behavioral data for one or more users. The derivative behaviors include intent driven behavioral data and habitual behavioral data. The method further includes deriving, by the processor, one or more behavioral triggers that differentiate the intent driven behavioral data from the habitual behavioral data. The method also includes generating, by the processor, a risk prediction based on a predictive risk assessment model that uses the intent driven behavioral data differentiated from the habitual behavioral data by the one or more behavioral triggers to enhance a predictive power of the user behavioral data. The method additionally includes enabling, by the processor, risk intervention for at least one of the one or more users by directly targeting the behavioral triggers, responsive to the risk prediction.

According to another aspect of the present principles, a non-transitory computer readable storage medium is provided. The non-transitory computer readable storage medium includes a computer readable program for personalized behavioral-driven event management. The computer readable program when executed on a computer causes the computer to perform a method. The method includes determining, by a processor, derivative behaviors from user behavioral data for one or more users. The derivative behaviors include intent driven behavioral data and habitual behavioral data. The method further includes deriving, by the processor, one or more behavioral triggers that differentiate the intent driven behavioral data from the habitual behavioral data. The method also includes generating, by the processor, a risk prediction based on a predictive risk assessment model that uses the intent driven behavioral data differentiated from the habitual behavioral data by the one or more behavioral triggers to enhance a predictive power of the user behavioral data. The method additionally includes enabling, by the processor, risk intervention for at least one of the one or more users by directly targeting the behavioral triggers, responsive to the risk prediction.

According to yet another aspect of the present principles, a system is provided for personalized behavioral-driven event management. The system includes a hardware processor. The hardware processor is configured to determine derivative behaviors from user behavioral data for one or more users. The derivative behaviors include intent driven behavioral data and habitual behavioral data. The hardware processor is further configured to derive one or more behavioral triggers that differentiate the intent driven behavioral data from the habitual behavioral data. The hardware processor is also configured to generate a risk prediction based on a predictive risk assessment model that uses the intent driven behavioral data differentiated from the habitual behavioral data by the one or more behavioral triggers to enhance a predictive power of the user behavioral data. The hardware processor is additionally configured to enable risk intervention for at least one of the one or more users by directly targeting the behavioral triggers, responsive to the risk prediction.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1:
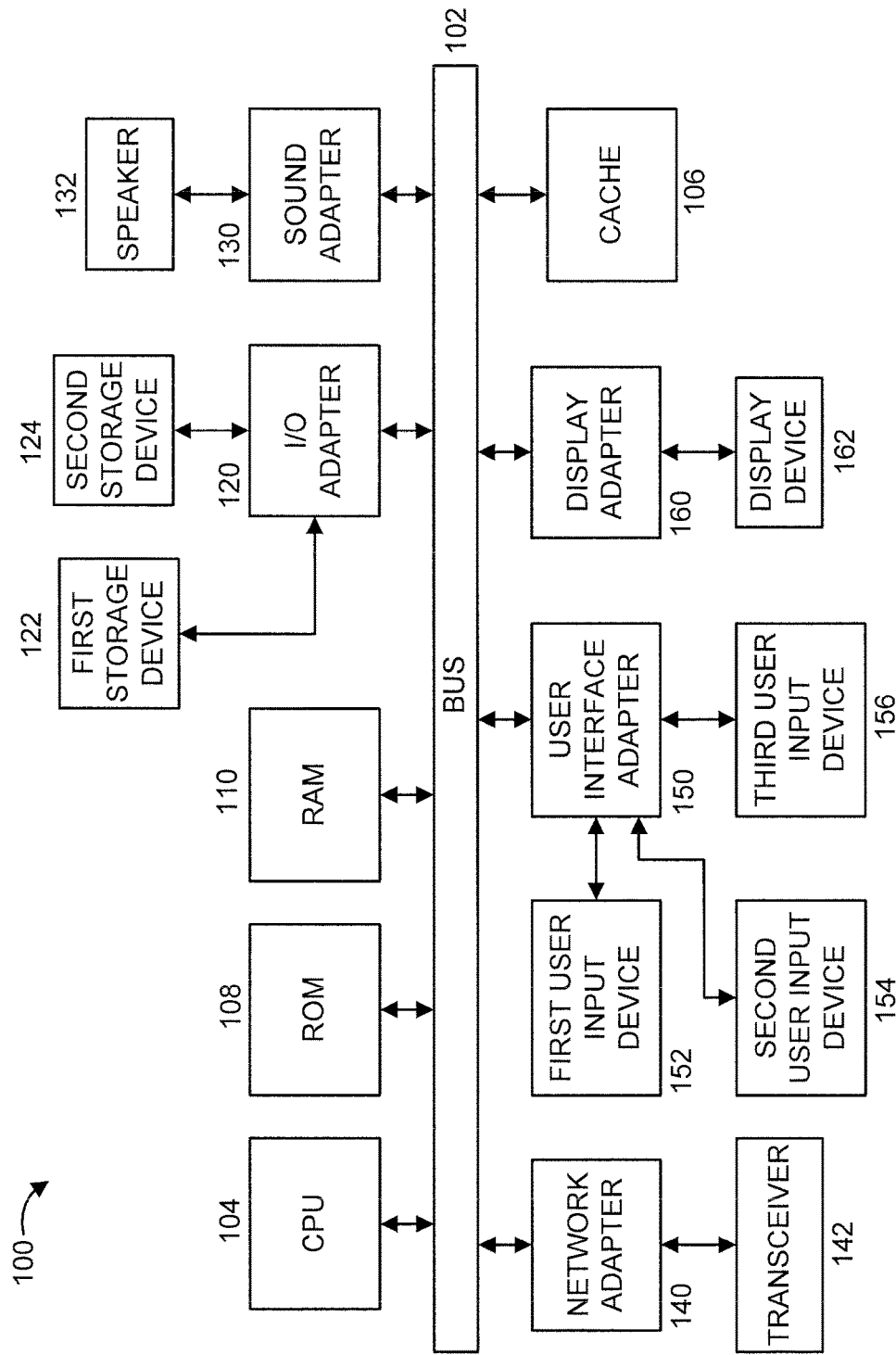
FIG. 1 shows an exemplary processing system to which the present principles may be applied, in accordance with an embodiment of the present principles.

The present principles are directed to personalized behavior-driven dynamic risk management with constrained service capacity.

The present principles provide many attendant features/advantages over prior art risk management solutions including, but not limited to, derivative behaviors, prediction capability (time to event inference), optimal intervention trajectory, and a dynamic update to fine-tune intervention effectiveness.

Further regarding derivative behaviors, the present principles utilize user behavioral data to derive behavioral triggers therefrom that differentiate intent driven behavioral data from habitual behavioral data with the goals of enhancing the predictive power of a risk assessment model and enabling more effective risk intervention by directly targeting the behavioral triggers.

Further regarding prediction capability, the present principles predict the likelihood of an event occurrence relating to an individual as a function of time and measure the impact of each of the behavioral triggers relating to the individual. In an embodiment, the prediction of a likelihood of an event occurrence can be implemented as a time-to-event assessment.

Regarding optimal intervention trajectory, an optimization model is used to solve a constrained integer problem in order to determine an optimal intervention trajectory over time, given different impacts of the behavioral triggers and also given various risk intervention strategies.

Regarding dynamic update, over time, the system continuously monitors the outcome of intervention strategies, and fine-tunes its prediction on the intervention effectiveness with respect to an individual user. This updated information is then fed to an optimization model which determines an optimal intervention strategy.

A scenario to which the present principles can be applied will now be described for the sake of illustration. Of course, the present principles are not limited solely to the following scenario and, thus, may be applied to other scenarios as readily contemplated by one of ordinary skill in the art given the teachings of the present principles provided herein, while maintaining the spirit of the present principles.

In the illustrative scenario, Client X was interested in understanding how to manage an attrition problem with one of its services. Eligible customers can enroll and terminate the service at any given time. The client had tracked various customer behavior data, including monthly log-ins, calls, offers given and redeemed, trading activities, cash holding, portfolio performance, and so forth. Based on all the available input data, a risk assessment model (e.g., a survival model) is used to predict the attrition risk associated with an individual customer. Responsive to the risk assessment model, various actions can be performed, for example, to mitigate or eliminate the risk, to inform the user of the risk, and/or so forth. The preceding and other actions that can be performed are readily determined by one of ordinary skill in the art given the teachings of the present principles provided herein, while maintaining the spirit of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
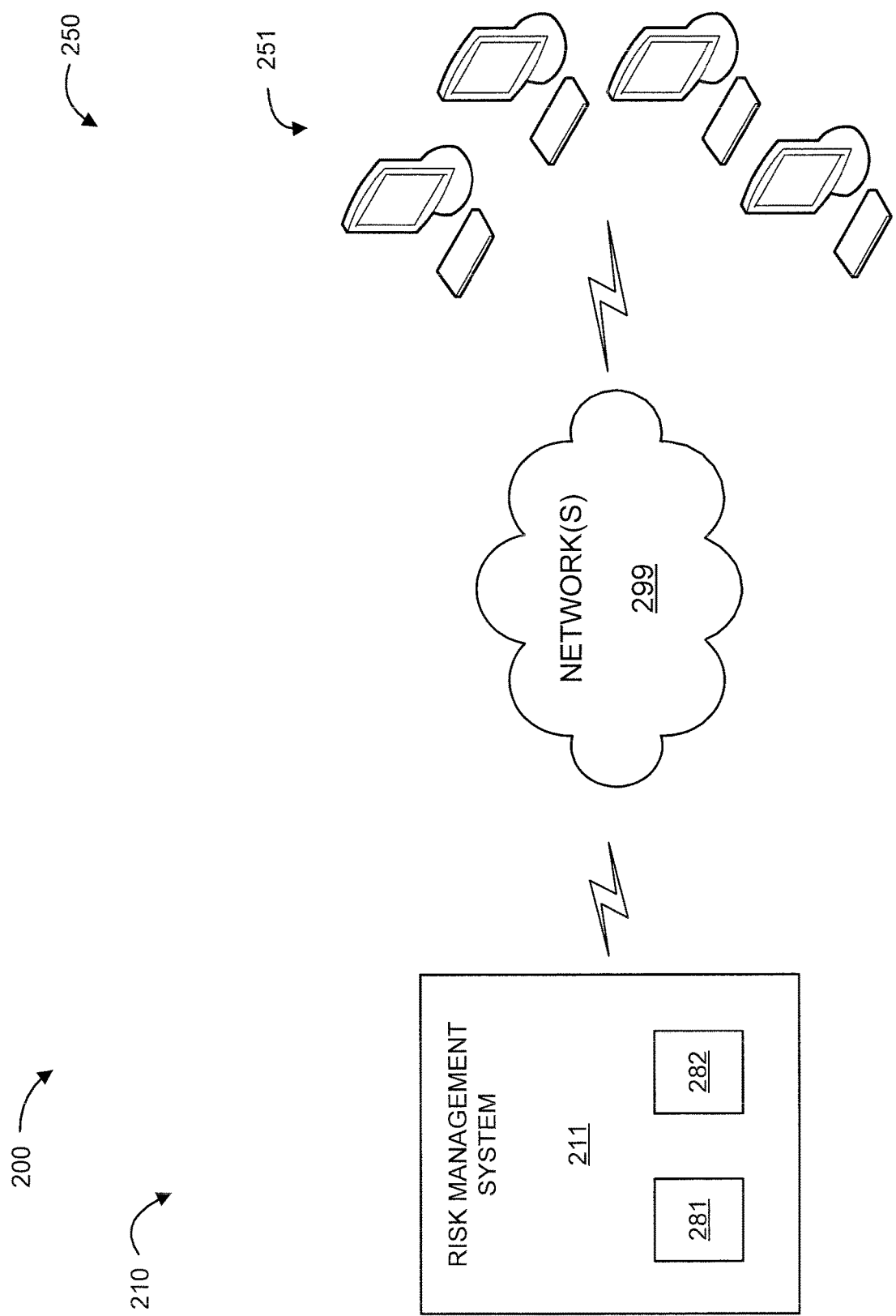
FIG. 2 shows an exemplary operating environment to which the present principles can be applied, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
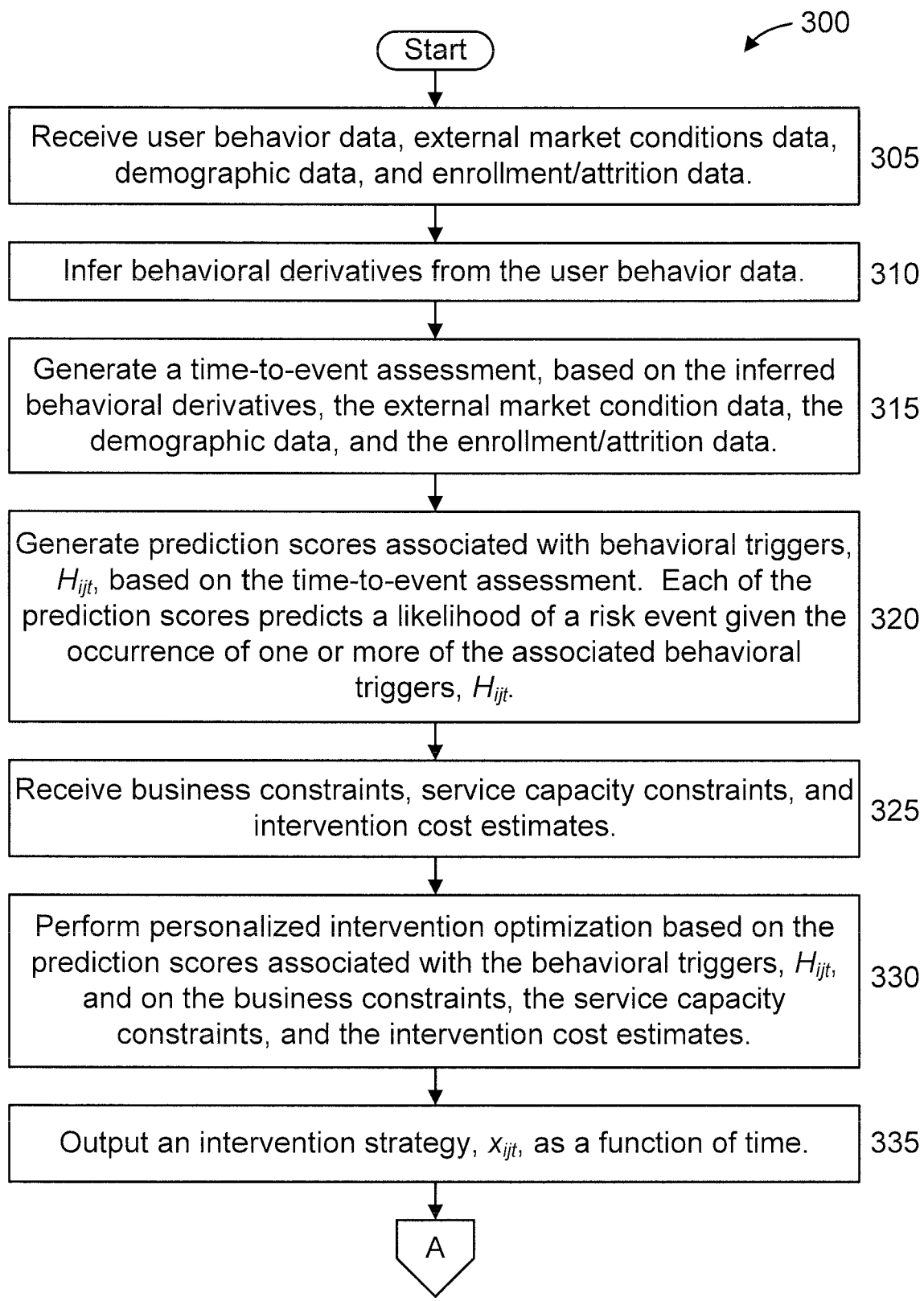
FIGS. 3-4 show an exemplary method for personalized behavior-driven risk management with constrained service capacity, in accordance with an embodiment of the present principles.
Figure 4:
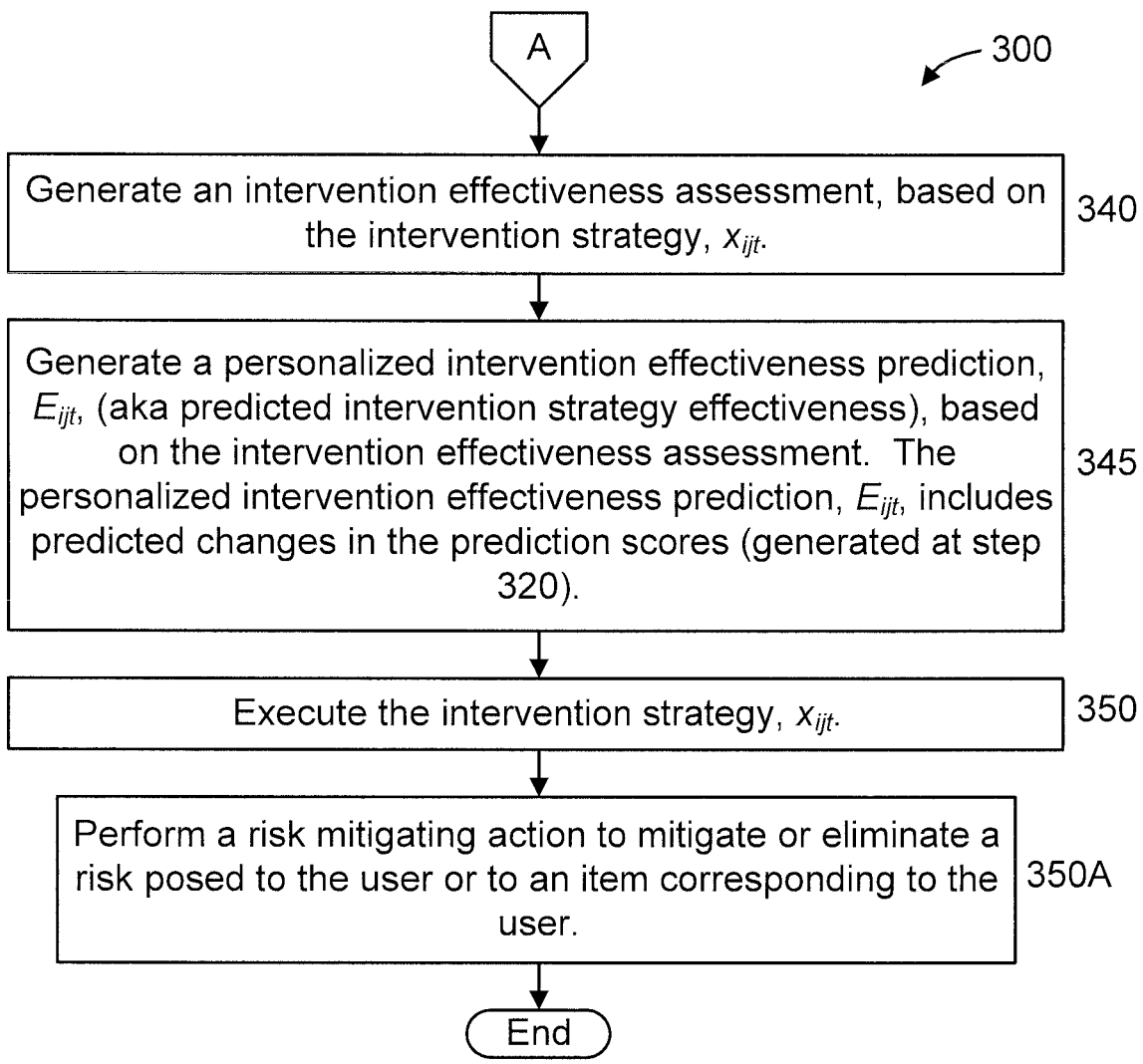

Further, it is to be appreciated that processing system 100 may perform at least part of the method described herein including, for example, at least part of method 300 of FIGS. 3-4. Similarly, part or all of system 200 may be used to perform at least part of method 300 of FIGS. 3-4.

FIG. 2 shows an exemplary operating environment 200 to which the present principles can be applied, in accordance with an embodiment of the present principles.

The environment 200 involves a server side 210 and a client side 250.

The server side 210 includes a risk management computer processing system (hereinafter "risk management system" in short) 211.

The client side 250 includes a set of workstations 251.

Users at the workstations 251 can provide various data inputs to the risk management system 211 in order to receive, for example, intervention strategies from the risk management system 211. Moreover, the risk management system 211 can be configured to automatically act upon a given intervention strategy in order to mitigate or eliminate a corresponding risk. Thus, in an embodiment, the risk management system 211 can acts as a repository for user behavioral data as well as other data related to risk management as described herein, and exploit such data to provide risk intervention strategies and/or initiate risk intervention actions based on the risk intervention strategies. Such other data can include, but is not limited to, external market conditions data, demographic data, enrollment/attrition data, business constraints, service capacity constraints, and intervention cost estimates. The risk management system 211 can provide the risk management information described herein using a predictive risk assessment model 281 and a risk intervention optimization model (also interchangeably referred to herein as "optimization model" in short) 282.

Communications between the server side 210 and the client side 250 are made through one or more networks 299.

FIGS. 3-4 show an exemplary method 300 for personalized behavior-driven risk management with constrained service capacity, in accordance with an embodiment of the present principles.

At step 305, receive user behavior data, external market conditions data, demographic data, and enrollment/attrition data.

At step 310, infer behavioral derivatives from the user behavior data. In an embodiment, the behavioral derivatives are inferred using a SME.

At step 315, generate a time-to-event assessment, based on the inferred behavioral derivatives, the external market condition data, the demographic data, and the enrollment/attrition data. In an embodiment, step 315 is performed by predictive risk assessment model 281. In an embodiment, step 315 includes generating the time-to-event assessment as a risk prediction that predicts the risk of an undesirable event.

At step 320, generate prediction scores associated with behavioral triggers, $H_{ijt}$, based on the time-to-event assessment. Each of the prediction scores predicts a likelihood of a risk event given the occurrence of one or more of the associated behavioral triggers, $H_{ijt}$.

At step 325, receive business constraints, service capacity constraints, and intervention cost estimates.

At step 330, perform personalized intervention optimization based on the prediction scores associated with the behavioral triggers, $H_{ijt}$, and on the business constraints, the service capacity constraints, and the intervention cost estimates. In an embodiment, step 330 is performed by the risk intervention optimization model (also interchangeably referred to herein as "optimization model" in short) 282.

At step 335, output an intervention strategy, $x_{ijt}$, as a function of time.

At step 340, generate an intervention effectiveness assessment, based on the intervention strategy, $x_{ijt}$.

At step 345, generate a personalized intervention effectiveness prediction, $E_{ijt}$, (aka predicted intervention strategy effectiveness), based on the intervention effectiveness assessment. The personalized intervention effectiveness prediction, $E_{ijt}$, includes predicted changes in the prediction scores (generated at step 320).

At step 350, execute the intervention strategy, $x_{ijt}$.

In an embodiment, step 350 includes step 350A.

At step 350, perform a risk mitigating action to mitigate or eliminate a risk posed to the user or to an item corresponding to the user. In an embodiment, the risk mitigating action can include an injury mitigating action that mitigates or eliminates a risk of injury to the user. Such injury can be physical, pecuniary, and/or so forth. The risk mitigating action can involve upselling, cross-selling, securing an item or facility (e.g., locking down a computer, locking a door, etc.), un-securing an item or facility (e.g., permitting access to a computer, unlocking a door, etc.), and so forth.

A description will now be given regarding behavioral triggers in accordance with the present principles.

One of the inputs to the risk assessment model is behavioral triggers, which are determined iteratively based on SME input and the prediction performance of the risk assessment model. The goal of these triggers is to enhance the predictive power of the risk assessment model by differentiating intent-driven behavior from habitual-driven behavior related to service termination.

As an example directed to behavioral triggers, the SME believed that frequent account monitoring activities (e.g., web log-ins, calls to customer service center) were positively correlated with service termination. However, users are heterogeneous, i.e., some users tend to manage their accounts more frequently than others users. As a solution in accordance with an embodiment of the present principles, a feature is derived which measures the difference between the most recent month activities and the rolling average of past months.

As another example directed to behavioral triggers, an interaction feature between two activities can be used when the impact of these two activities is nonlinear on the target.

A description will now be given regarding risk assessment in accordance with the present principles.

An extended survival model (risk assessment model) with dynamic covariates and lagged variables was used to model the hazard rate associated with terminating the service, as follows:

$$h(t,X)=h_0(t)\exp(\Sigma_{i=1}^{P}\beta_i X_i)$$

In the preceding equation, X represents the vector of covariates of length p, its individual covariate is denoted by $X_i$, $h_0(t)$ represents the baseline hazard at period t, $\beta_i$ represents the coefficients, exp(.) refers to the exponential function, and p is the number of covariates.

A semi-parametric model as the baseline hazard $h_0(t)$ can take any form, covariates enter the model linearly=>a more "robust" model=>popularity in practice.

The baseline hazard function depends on time to capture the dynamic nature of risk.

The model incorporates time-dependent covariates (e.g., behavior data) and static information (e.g., demographics).

A description will now be given regarding an exemplary outcome from the risk assessment model, in accordance with an embodiment of the present principles.

In the embodiment, an attrition risk prediction is provided as a function of time that answers when and who are at risk.

A critical period for intervention to reduce attrition: the initial 188 months after account opening. Attrition risk rises steadily during the initial 12 months and peaks at 1 year. The attrition risk falls back to its initial level from account opening approximately at the 18th month.

Behavioral triggers and their associated risk score are provided at an individual level. Hence, the present principles can provide an "early warning" to facilitate effective risk management.

A description will now be given regarding personalized risk management optimization with service capacity constraints.

For a user i, given his/her risk scores associated with behavioral triggers at the period t, $H_{ijt}$, and predicted intervention strategy effectiveness $E_{ijt}$, (i.e., reduction in risk scores when the intervention j is used) the decision variable is $X_{ijt}=\{0, 1\}$, i.e., whether to use strategy j for user i during period t.

The following equation relates to maximizing the benefit from intervention (i.e., reduction in risk) across users, across strategies and across time:

$$\underset{X_{ijt}}{\text{maximize}} \sum_i \sum_j \sum_{t=t'+1}^{t'+T} E_{ijt} X_{ijt}$$

where $X_{ijt}$ denotes a risk intervention strategy, $E_{ijt}$ denotes a predicted intervention strategy, T denotes the look-ahead period for solving the optimization problem (see an example below), i denotes a given user, j denotes a particular intervention, t' denotes a given time, while t is a variable which increases from t'+1 to t'+T for a given t'. For example, suppose T=3 (i.e., we only optimize for the next 3 periods). When the current observation takes place at t'=1, the optimization problem solves for the decisions between period 2 to period 4. When the next observation comes at t=2, then we are solving the optimization problem for period 3 to period 5.

The following equation relates to a total budget constraint, $C_{ijt}$:

$$\text{subject to } \sum_i \sum_j \sum_{t=t'+1}^{t'+T} C_{ijt} X_{ijt} \leq B,$$

The following equation relates to exercising at most n interventions for user i during the next T periods:

$$\sum_j \sum_{t=t'+1}^{t'+T} X_{ijt} \leq n, \forall i$$

The following equation relates to a user's risk score having to be below a certain threshold in time period t:

$$\Sigma_j H_{ijt} - E_{ijt} X_{ijt} \leq \text{Threshold}_t, \forall i, t,$$

where $\forall i$ denotes for all users i and for all periods t.

The following equations relate to a budget, $B_{jt}$, for a given individual:

$$\sum_i C_{ijt} X_{ijt} \leq B_{jt}, \forall i, t,$$

$$X_{ijt} = 0, 1, \forall j, t,$$

A description will now be given regarding recommendations capable of being made in accordance with the present principles, in accordance with an embodiment of the present principles.

Client X had several intervention strategies including an email newsletter to advertise its services, promotions (e.g., coupons) and having a customer service representative engage in a personal conversation with users.

As strategies comes with different costs and effectiveness at mitigating risks, the optimization model balances the service constraints and optimizes the individual intervention strategies over time.

Figure 5:
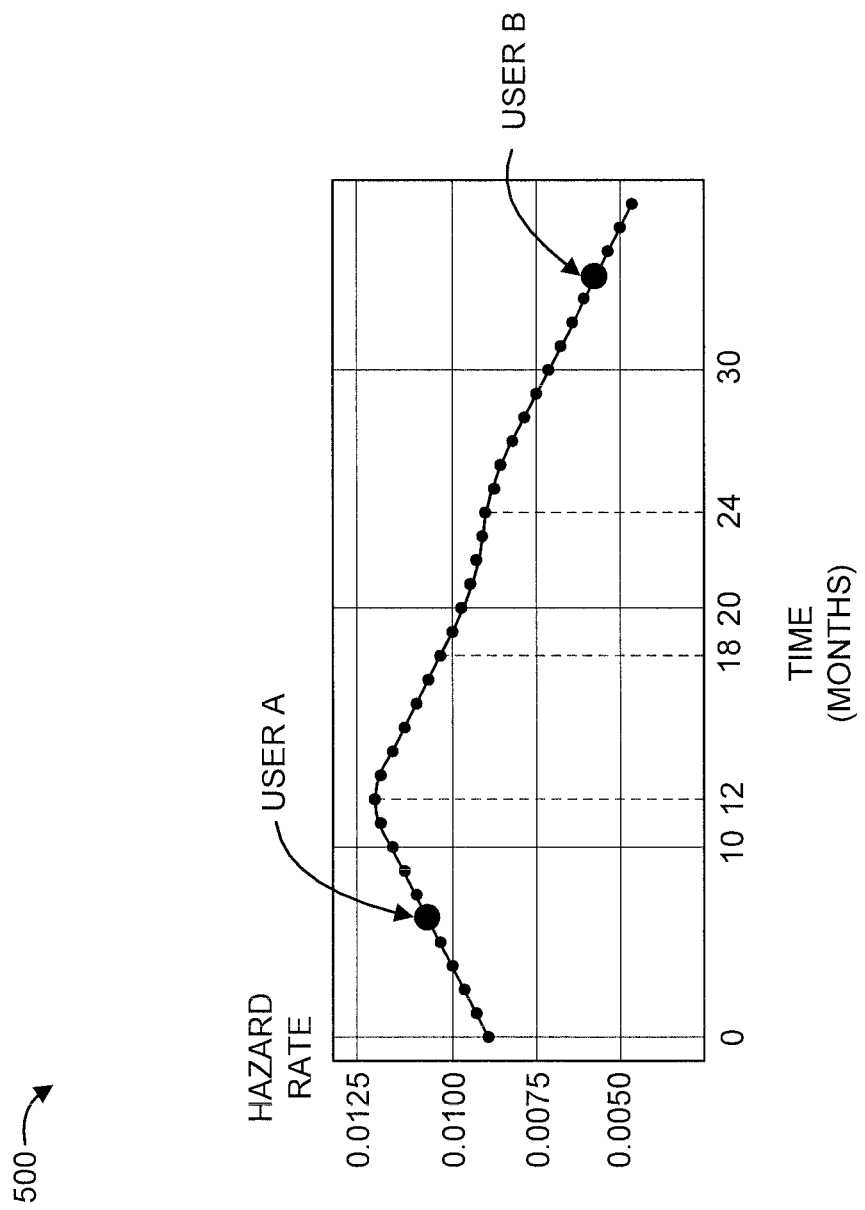
FIG. 5 shows an exemplary output of a 6-period intervention strategies with respect to two customers (user A and user B) who have the same set of attributes but different enrollment dates, in accordance with an embodiment of the present principles.

FIG. 5 shows an exemplary output 500 of a 6-period intervention strategies with respect to two customers (user A and user B) who have the same set of attributes but different enrollment dates, in accordance with an embodiment of the present principles.

TABLE 1 shows the recommended intervention strategy for user A, in accordance with an embodiment of the present principles. TABLE 2 shows the recommended intervention strategy for user B, in accordance with an embodiment of the present principles. A "1" in a column in TABLES 1 and 2 for a particular strategy indicates that the particular strategy is used during the month corresponding to that column. User A who has a shorter enrollment period is predicted to be at higher risk, thus, more frequent interventions with more aggressive (i.e., costly) strategies are recommended. Meanwhile, user B who is predicted to have a lower risk due to longer enrollment period, less aggressive intervention strategy is recommended.

TABLE 1

|  | t + 1 | t + 2 | t + 3 | t + 4 | t + 5 | t + 6 |
| --- | --- | --- | --- | --- | --- | --- |
| newsletter | 0 | 0 | 0 | 0 | 0 | 0 |
| Coupon | 0 | 0 | 1 | 0 | 0 | 0 |
| Call | 0 | 0 | 0 | 0 | 1 | 0 |

TABLE 2

|  | t + 1 | t + 2 | t + 3 | t + 4 | t + 5 | t + 6 |
| --- | --- | --- | --- | --- | --- | --- |
| newsletter | 0 | 1 | 0 | 0 | 0 | 0 |
| Coupon | 0 | 0 | 0 | 0 | 0 | 0 |
| Call | 0 | 0 | 0 | 0 | 0 | 0 |

Exemplary applications/uses to which the present principles can be applied include, but are not limited to: business applications; customer attrition risk; upselling opportunity; cross-selling opportunity; personal injury risk; pecuniary injury risk; and so forth. These and other applications of the present principles enable an efficient collection, processing, and means for utilizing digitally available and communicated data over one or more communication networks. Such collection, processing, and utilization in accordance with the present principles allows for tailored risk intervention through technological means such as, but not limited to, computers, communication networks, and optimized computer-generated models. For example, as mentioned above, risk intervention can involve initiating an action using such technological means in order to reduce a risk or eliminate it outright. Additionally, by considering the dynamic nature of risk and determining time-dependent individual intervention trajectories, the present principles can continue to issue such actions in accordance with changes in the risk to continually manage the risk over time. Moreover, embodiments of the present principles can be implemented using a distributed system architecture as described herein in order to remotely manage risk via communication over one or more communication networks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
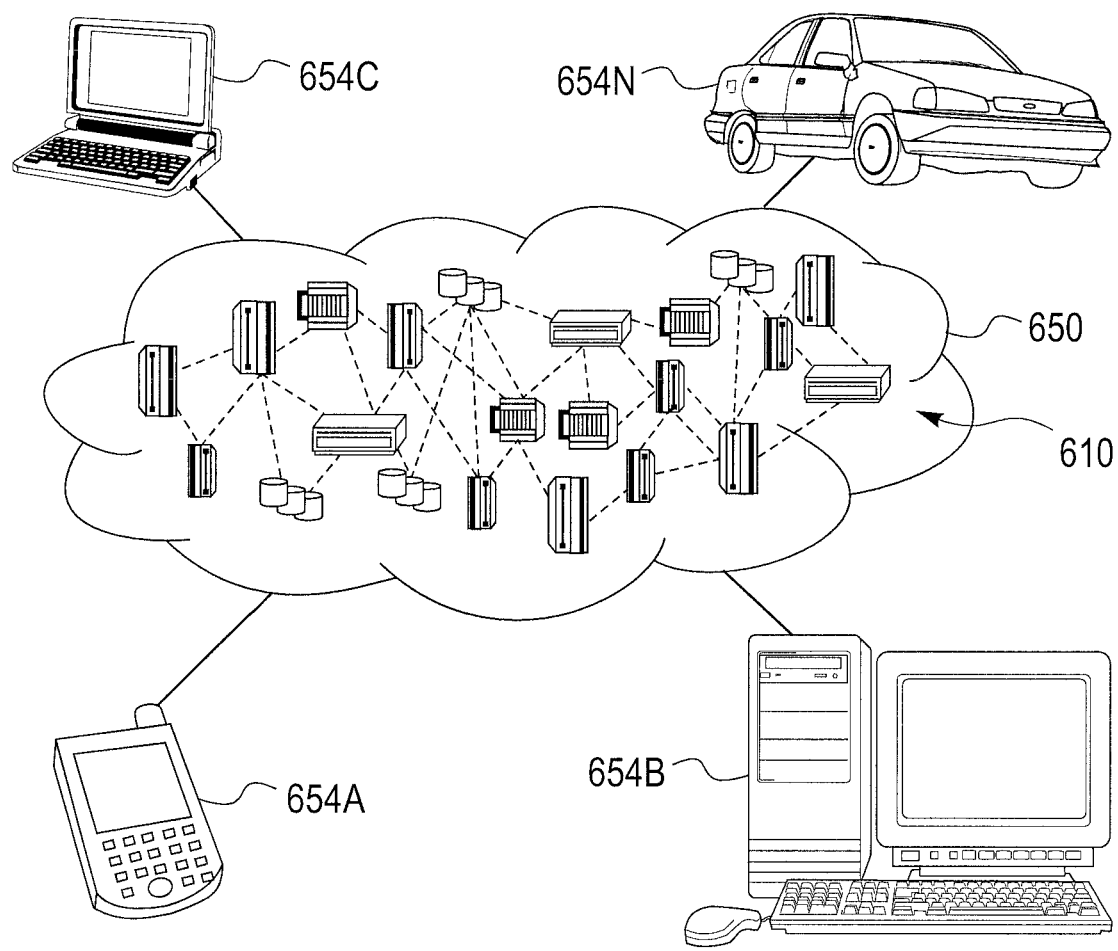
FIG. 6 shows an exemplary cloud computing environment, in accordance with an embodiment of the present principles.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
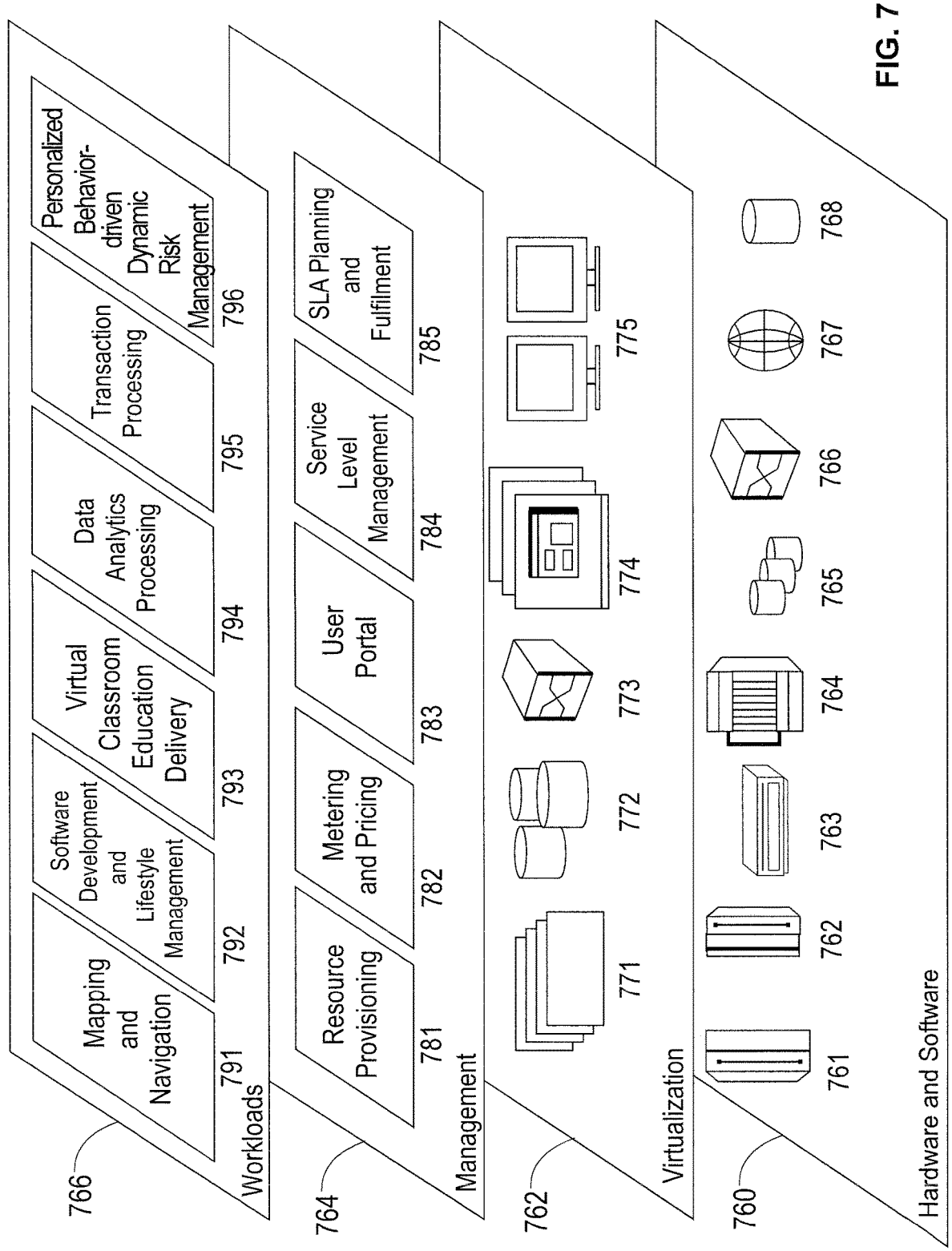
FIG. 7 shows an exemplary set of functional abstraction layers provided by the cloud computing environment shown in FIG. 6, in accordance with an embodiment of the present principles.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and personalized behavior-driven risk management 796.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for personalized behavioral-driven event management, comprising:
   determining, by a processor, derivative behaviors from user behavioral data for one or more users, the derivative behaviors including intent driven behavioral data and habitual behavioral data relating to service termination activity differentiation;
   deriving, by the processor, one or more behavioral triggers that differentiate the intent driven behavioral data from the habitual behavioral data;
   generating, by the processor, one or more risk predictions based on a predictive risk assessment model that uses the intent driven behavioral data differentiated from the habitual behavioral data by the one or more behavioral triggers to enhance a predictive power of the user behavioral data;
   generating, by the processor, prediction scores associated with the behavioral triggers based on the one or more risk predictions, each of the prediction scores predicting a likelihood of a risk event given an occurrence of one or more of the associated behavioral triggers; and
   controlling, by the processor based on a risk intervention optimization model, a processor-based machine posing a potential personal injury risk to at least one of the one or more users by securing the processor-based machine from further operation to mitigate the potential personal injury risk to the at least one of the one or more users, responsive to an optimal risk intervention trajectory determined for a given time period by solving a constrained integer problem that evaluates different impacts of the behavioral triggers and different risk intervention strategies using business budget constraints, service capacity constraints, intervention cost constraints, external market conditions data, enrollment data, and enrollment attrition data.

2. The method of claim 1, further comprising:
   predicting, as a function of time, a likelihood of a risk event occurrence involving the processor-based machine and implicated by the risk prediction; and
   measuring an impact of each of the behavioral triggers on the predicted likelihood of the risk event occurrence.

3. The method of claim 1, further comprising:
   generating risk intervention strategies for the one or more users; and
   generating an effectiveness prediction for each of the risk intervention strategies.

4. The method of claim 3, further comprising:
   monitoring respective outcomes of the risk intervention strategies over a given time period; and
   refining the effectiveness prediction for at least some of the risk intervention strategies based on results of said monitoring step.

5. The method of claim 4, further comprising determining an optimal intervention strategy by the risk intervention optimization model based on the effectiveness prediction and the refined effectiveness prediction for each of the risk intervention strategies.

6. The method of claim 1, further comprising generating one or more risk intervention strategies responsive to the risk prediction.

7. The method of claim 6, further comprising optimizing at least one risk intervention strategy from among the one or more risk intervention strategies based on prediction scores associated with the behavioral triggers.

8. The method of claim 7, wherein the at least one risk intervention strategy is optimized further based on predicted changes in the prediction scores.

9. The method of claim 6, wherein the one or more risk intervention strategies are generated further responsive to additional data selected from the group consisting of business constraints, service capacity constraints, and intervention cost estimates.

10. The method of claim 1, wherein the risk prediction is generated based on data selected from the group consisting of the intent driven behavioral data, the habitual behavioral data, external market condition data, demographic data, enrollment data, and attrition data.

11. A non-transitory computer readable storage medium comprising a computer readable program for personalized behavioral-driven event management, wherein the computer readable program when executed on a computer causes the computer to perform the steps of:
   determining, by a processor, derivative behaviors from user behavioral data for one or more users, the derivative behaviors including intent driven behavioral data and habitual behavioral data relating to service termination activity differentiation;
   deriving, by the processor, one or more behavioral triggers that differentiate the intent driven behavioral data from the habitual behavioral data;

generating, by the processor, one or more risk predictions based on a predictive risk assessment model that uses the intent driven behavioral data differentiated from the habitual behavioral data by the one or more behavioral triggers to enhance a predictive power of the user behavioral data;

generating, by the processor, prediction scores associated with the behavioral triggers based on the one or more risk predictions, each of the prediction scores predicting a likelihood of a risk event given an occurrence of one or more of the associated behavioral triggers; and controlling, by the processor based on a risk intervention optimization model, a processor-based machine posing a potential personal injury risk to at least one of the one or more users by securing the processor-based machine from further operation to mitigate the potential personal injury risk to the at least one of the one or more users, responsive to an optimal risk intervention trajectory determined for a given time period by solving a constrained integer problem that evaluates different impacts of the behavioral triggers and different risk intervention strategies using business budget constraints, service capacity constraints, intervention cost constraints, external market conditions data, enrollment data, and enrollment attrition data.

12. The method of claim 11, further comprising:
predicting, as a function of time, a likelihood of a risk event occurrence implicated by the risk prediction; and
measuring an impact of each of the behavioral triggers on the predicted likelihood of the risk event occurrence.

13. The method of claim 11, further comprising:
generating risk intervention strategies for the one or more users; and
generating an effectiveness prediction for each of the risk intervention strategies.

14. A system for personalized behavioral-driven event management, comprising:
a memory device including program code stored thereon; and
a hardware processor operatively coupled to the memory device, and configured to run the program code stored on the memory device to determine derivative behaviors from user behavioral data for one or more users, the derivative behaviors including intent driven behavioral data and habitual behavioral data relating to service termination activity differentiation;

derive one or more behavioral triggers that differentiate the intent driven behavioral data from the habitual behavioral data;

generate one or more risk predictions based on a predictive risk assessment model that uses the intent driven behavioral data differentiated from the habitual behavioral data by the one or more behavioral triggers to enhance a predictive power of the user behavioral data;

generate prediction scores associated with the behavioral triggers based on the one or more risk predictions, each of the prediction scores predicting a likelihood of a risk event given an occurrence of one or more of the associated behavioral triggers; and control, based on a risk intervention optimization model, a processor-based machine posing a potential personal injury risk to at least one of the one or more users by securing the processor-based machine from further operation to mitigate the potential personal injury risk to the at least one of the one or more users, responsive to an optimal risk intervention trajectory determined for a given time period by solving a constrained integer problem that evaluates different impacts of the behavioral triggers and different risk intervention strategies using business budget constraints, service capacity constraints, intervention cost constraints, external market conditions data, enrollment data, and enrollment attrition data.

15. The method of claim 1, further comprising:
generating an intervention effectiveness assessment, based on an intervention strategy; and
generating a personalized intervention effectiveness prediction, based on the intervention effectiveness assessment.

16. The method of claim 15, wherein the personalized intervention effectiveness prediction includes predicted changes in the prediction scores.

* * * * *